United States Patent [19]

Fischer

[11] 4,179,043
[45] Dec. 18, 1979

[54] ROTARY VALVE APPARATUS

[75] Inventor: John Fischer, Montoursville, Pa.

[73] Assignee: Koppers Company, Inc., Pittsburgh, Pa.

[21] Appl. No.: 866,644

[22] Filed: Jan. 3, 1978

[51] Int. Cl.² ............................................. G01F 11/24
[52] U.S. Cl. ...................................... 222/368; 34/242; 414/219
[58] Field of Search ........................... 222/368; 34/242; 414/219; 406/65

[56] References Cited

U.S. PATENT DOCUMENTS

| | | | |
|---|---|---|---|
| 2,754,995 | 7/1956 | Switzer | 222/368 X |
| 3,410,000 | 11/1968 | Freeman | 34/242 |
| 3,708,890 | 1/1973 | Weisselberg | 214/17 CC X |

Primary Examiner—F. J. Bartuska
Attorney, Agent, or Firm—Thomas L. Sivak; Oscar B. Brumback

[57] ABSTRACT

A rotary valve apparatus suitable for transporting particulate solid materials from one pressure region to another pressure region, each pressure region may be at different operating temperatures. The apparatus includes a stationary housing defining a generally cylindrical shaped chamber with inlet and outlet openings; end walls enclosing the cylindrical chamber; an elongated shaft journaled centrally within the housing and end walls; and a plurality of vanes affixed to the shaft. The vanes are in communication with the walls of the cylindrical chamber to form a seal. The seal between the vane and cylindrical chamber wall is effectuated by a vane blade which is affixed to each vane. Vane blades are constructed using a metal blade partially sandwiched between an elastomer material, the exposed portion of metal blade is in a sealing engagement with the walls of the cylindrical chamber. At the end of the vanes are shrouds which, in cooperation with the vane, form pockets. Sealing between the pockets and the end walls is accomplished by placing a resilient packing around the cylindrical chamber in between the shrouds and end walls.

2 Claims, 5 Drawing Figures

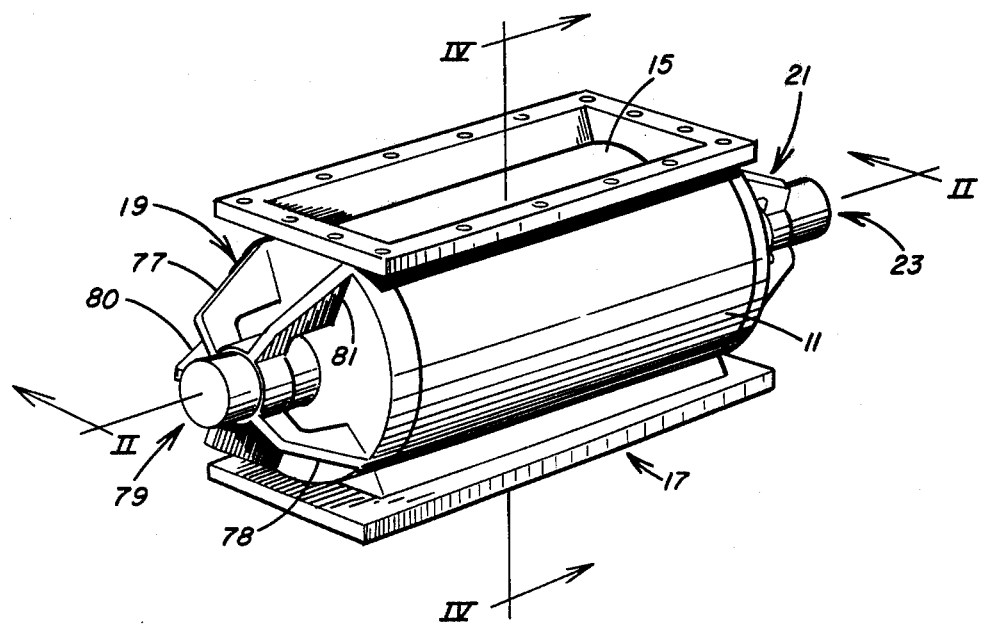
FIG. 1
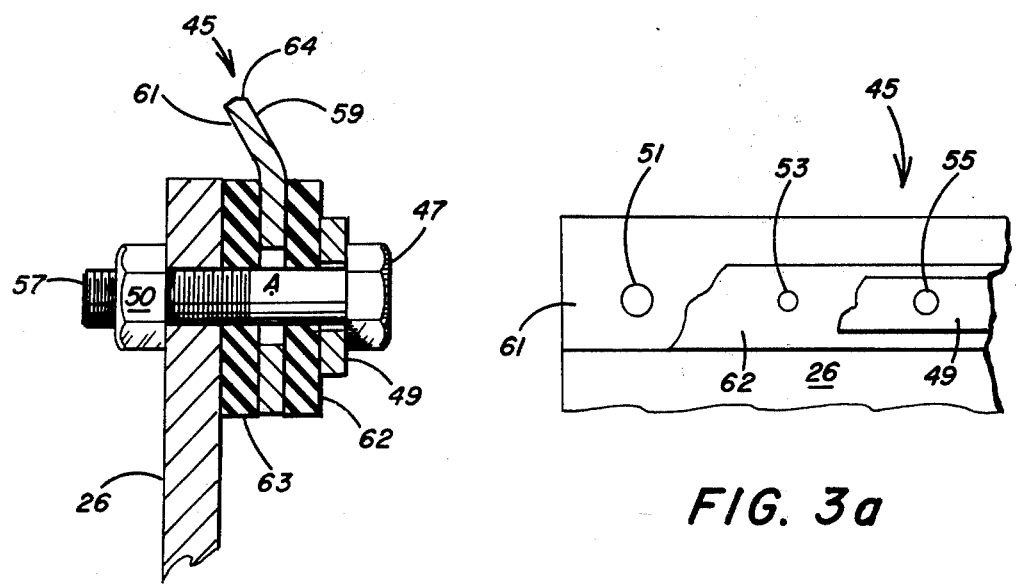
FIG. 3
FIG. 3a

ROTARY VALVE APPARATUS

BACKGROUND OF THE INVENTION

This invention relates generally to rotary valve apparatus and, more particularly, to apparatus of this type that are adapted to handle materials at various temperatures while continuously maintaining an effective seal against the leakage of gases through the apparatus.

Rotary valve apparatus are used as air locking devices for transferring particulate solid materials between two regions having differing pressures, and as volumetric feeders. When the apparatus is functioning as an air locking device, it is desirable that changes in pressure between the two regions be held to a minimum since such pressure changes can constitute a hazard or create such deleterious effects as corrosion, contamination and erosion, or systematic loss of efficiency.

Typically, rotary valve apparatus consist of a cylinder housing having inlet and outlet openings for material passage and a rotating unit within the housing having a number of pockets for transferring material from the inlet to the outlet openings. The closer the clearance between the housing and the rotating unit can be held, the less leakage (pressure loss) there will be. The pockets have been formed by using vanes along an axial member in a sealing engagement with the walls of the cylindrical chamber. The tips of the vanes have been a point of attention in trying to alleviate the problem of leakage. The solutions have been varied, one being the employment of a metal strip across the vane biased by springs and/or a gas pressure applied to the metal strips. Another attempted solution employed the use of flexible vane blade members. The main problems encountered have been caused by particles becoming entrapped between the vane blade portion of the vane and the housing which causes bending or abrasion, and, therefore, leakages. In addition, those devices which employ a flexible blade member place a pressure constraint on the system. High system pressure may cause the flexible blade to excessively deform, providing a means for system pressure loss.

The devices used in the prior art attempt to accommodate varied operational temperatures by allowing for thermo-expansion, and by so doing, have sacrificed efficiency at off design parameters.

This invention minimizes the leakage problems and the destructive effects resulting from trapped particles between the vane blade and housing, yet maintains an effective seal at different operating temperatures, and system pressures.

SUMMARY OF THE INVENTION

The rotary valve apparatus described herein is especially suited for handling materials of various particulate sizes over an extended range of operating temperatures from both pressurized and unpressurized systems.

An embodiment of the rotary valve apparatus of the present invention includes a housing defining a generally cylindrical chamber having opposing inlet and outlet openings for passing material to and from the chamber; end walls enclosing the cylindrical chamber; a shaft disposed centrally within the chamber; and a plurality of vanes carried by the shaft having a blade section for establishing and maintaining at all operating temperatures a sealing engagement with the side walls of the chamber. Each vane blade is comprised of a metal strip partially sandwiched between an elastomer material. The blade configuration allows for thermo-expansion without degradation of the seal by translating vane thermo-expansion to angular rotation within the vane blade. By maintaining a minimal contact area between the cylindrical chamber wall and the vane blades, the effects of trapped particles are minimized.

Sealing between the end walls and vanes is accomplished by placing shrouds at the longitudinal extremes of the vane and a packing, preferably of an asbestomer material, i.e., materials which are flexible and embody a high percentage of asbestos or similar materials in their construction, between the shrouds and end walls in contact with the cylindrical chamber wall. The packing is under a pressurizing influence, thereby maintaining an effective seal at different operational temperatures.

BRIEF DESCRIPTION OF THE DRAWINGS

FIG. 1 is a perspective view of the rotary valve apparatus.

FIG. 3 is an enlarged cross-sectional view of the vane blade.

FIG. 3a is a sectioned side view of the vane blade.

DETAILED DESCRIPTION OF THE PREFERRED EMBODIMENT

Figure 2:
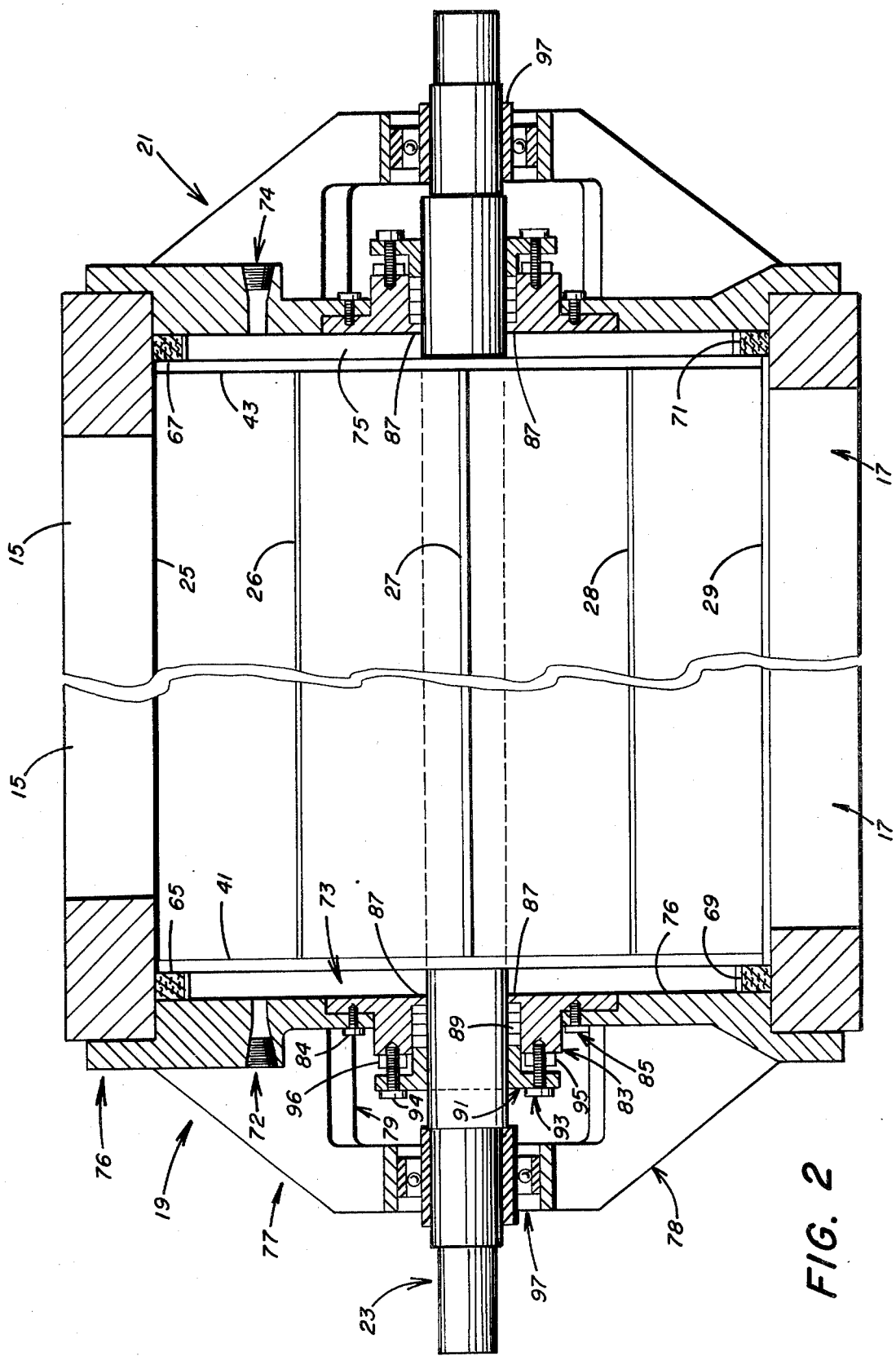
FIG. 2 is a cross-sectional view of the rotary valve apparatus taken along line II—II.

The rotary valve apparatus for transferring particulate material from one system to another under varied operational conditions consists of a housing 11 (FIGS. 1 and 4) defining a generally cylindrical shaped open-ended chamber 13 with an inlet opening 15 for receiving particulate material, and outlet opening 17 for depositing the material from the housing 11. End walls 19 and 21 are fixably mounted by any conventional means to the housing 11, enclosing the cylindrical chamber 13. Running axially through the cylindrical chamber 13 and end walls 19 and 21 is a shaft 23, shaft 23 being rotatably mounted therein. The shaft 23 has fixably mounted to it vanes 25-32 (FIGS. 2 and 4), the vanes being mounted to the shaft by conventional means. The vanes 25-32 extend axially throughout the cylindrical chamber 13 and have fixably mounted to their extremes shrouds 41 and 43, which are also fixably mounted by conventional means to the shaft 23. The shrouds 41 and 43 are of a circular construction with a radial extension within the cylindrical chamber 13 providing for a minimum clearance sufficient to allow for maximum thermal change without engaging the cylindrical chamber wall 44.

Figure 4:
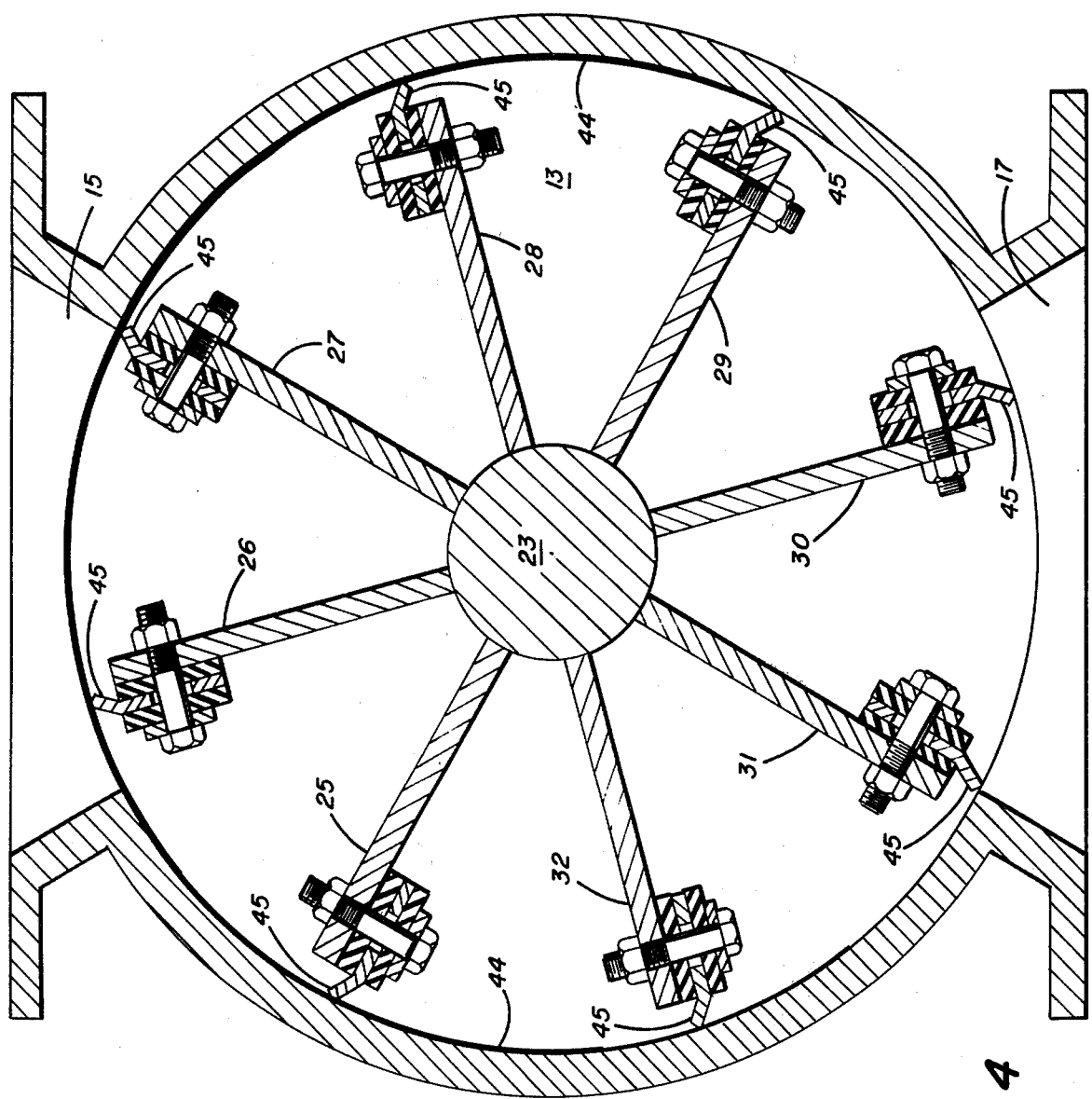
FIG. 4 is a cross-sectional view of the rotary valve apparatus taken along line IV—IV.

Referring to FIGS. 3, 3a and 4, affixed to the radial extremes of each vane 25-32, having an axial extension equal to that of the vane and in communication with cylindrical chamber wall 44, is a vane blade 45. A vane blade 45 is affixed to each vane by three bolts 47. To affix a vane blade 45 to a vane, each of the three bolts 47 are journeyed through a clamp bar 49, the vane blade 45, and carring vane. A nut 50 is thereafter affixed to each bolt 47.

A vane blade 45 is comprised of a metal strip 61 partially sandwiched between two strips of an elastomer material 62 and 63 (FIGS. 3 and 3a). The two strips of elastomer material 62 and 63 have each therein three holes 53. The metal strip 61 and clamp bar 49, also, have three holes 51 and 55, respectively, each therein. The holes 51, 53 and 55 are aligned to permit the passage of bolts 47 therethrough. That portion of the metal strip 61 which is not sandwiched between the elastomer material comprises an elbowed extension of the metal strip 61. The elbow extension is directed away from the direction of rotation of shaft 23. The three holes 51 in the metal strip 61 have a diameter larger than the stem 57 of bolts 47. Referring to FIGS. 3 and 4, when the vane blade 45 is affixed to a vane (either 25, 26, 27, 28, 29, 30, 31 or 32) in the aforedescribed manner, any elongation of a vane will result in a reactive force acting on the tip of the vane blade 45 exerted by the cylindrical chamber wall 44. The reactive force will be directed radially inward. Because of the elbowed configuration of the metal strip 61, a moment is created about a point A. Because the metal strip 61 is unable to overcome the friction forces between itself and the elastomer strips 62 and 63, radially directed linear displacement is restrained; consequently, the metal strip 61 will rotate about point A. The rotation of the metal strip will place the elastomer materials 62 and 63 in compression. Therefore, in order to allow proper rotation of the metal strip 61, the holes in the metal strip must be of a sufficient diameter so as not to allow the bolt 47 to inhibit the metal strip 61 from rotating.

High system pressure will not degrade the sealing engagement between the vane blade 45 and the cylindrical chamber wall 44. Referring to FIGS. 3 and 4, system pressure exerted on the metal strip surface 59 is counteracted by the elastomer strips 62 and 63.

The vanes 25-32, in combination with the shrouds 41, 43 and shaft 23, form discreet volume pockets enabling the apparatus to be used as a volumetric feeder. Material is received by the pockets through the inlet opening 15. As the pocket is rotated by the shaft 23, it becomes enclosed by the walls of the cylindrical chamber, sealing being accomplished when the vane blade 45 becomes engaged with the cylindrical chamber wall 44. Leakage opposed to the direction of rotation is restrained by advancing pockets. As the pocket encounters the outlet opening 17, the particulate material is discharged. The rate of material discharged is controlled by the rate of rotation of the shaft.

Thermo-expansion of the vanes 25-32 is translated to a compression of the elastomer strips 62 and 63 on the vane blade 45 in a manner as aforedescribed, thereby maintaining an effective seal throughout the operational temperature range. The elastomer strips in the preferred embodiment are silicone rubber able to withstand temperatures of up to 500° F.; also the tip of the metal strip 61 can be hard surfaced on the wearing edge, with STELLITE or similar material. Additionally, a minimum contact surface 64 (FIG. 3) is provided on the metal strip 61 to alleviate the problem of entrapped particles between the vane blade 45 and cylindrical chamber wall 44.

Referring to FIG. 2, between the shrouds 41 and 43, and end walls 19 and 21, respectively, lining the cylindrical chamber wall 44 are resilient packings 65 and 67, which, in the preferred embodiment, is asbestos impregnated with either graphite or TEFLON. Lining the inward face of the packings are expansion rings 69 and 71. The alignment of the shrouds 41 and 43 to end walls 19 and 21 creates chambers 73 and 75, which are pressured, thereby assuring that the resilient packings 65 and 67 maintain an effective seal. Pressure is introduced into chambers 73 and 75 through pipe taps 72 and 74.

Each end wall 19 and 21 is comprised of a generally circular plate 76, which has mounted to it by conventional means support arms 77-81 (FIGS. 1 and 2). The circular plate has a hole at its center. A circular packing housing 83 is fitted in the circular plate 76 as shown in FIG. 2. The packing housing 83 is mounted to the circular plate 76 by passing screws 84 and 85 through the circular plate 76 and lodging screws 84 and 85 into the packing housing 83. The packing housing 83 has a hole at its center. The interior circumferential edge of the packing housing 83 forms a circular collar 87. Shaft 23 is passed through the packing housing 83. Between the packing housing 83 and shaft 23 are placed resilient packing rings 89. A collared ring 91 is subsequently placed between the shaft 23 and the packing housing 83. Screws 93 and 94 are passed through the collar of the collared ring 91 and lodged in nuts 95 and 96. Nuts 95 and 96 are fixably mounted by conventional means to the packing ring 83. By tightening the screws 93 and 94, pressure is transferred to the resilient rings 89, thereby forming a seal so that there is no pressure loss from chambers 73 and 75.

Ball bearing assemblies 97 are placed between the support arms 77-81. Shaft 23 is passed through ball bearings 97, thereby rotably supporting shaft 23.

When the invention is operating at high temperatures, vane thermoexpansion is permitted without any deleterious effect on the pocket seal. Thermo-expansion in the radial direction is translated to a compression of the silicone rubber on the vane blade as aforedescribed, leaving the metal member of the vane blade in sealing contact with the chamber walls 44. Thermo-expansion in the axial directions is translated to compression of the resilient packings 65 and 67 without deleterious effect on the seal. Entrapped particles between the vane blade 45 and cylindrical chamber 44 is minimized by having a minimal contact surface 64 between the vane blade and the cylindrical chamber wall (refer to FIGS. 3 and 4).

I claim:
1. A rotary valve apparatus comprising:
   (a) a housing defining an open-ended generally cylindrical chamber;
   (b) a plurality of end walls axially spaced along said housing, mounted to said housing enclosing said cylindrical chamber;
   (c) inlet means for receiving material in said chamber;
   (d) outlet means for depositing material from said chamber;
   (e) a rotatable shaft extending axially throughout said cylindrical chamber and rotatably mounted in said end walls;
   (f) a plurality of vanes fixably mounted to said shaft and extending radially from said shaft, said vanes having an axial extension throughout said chamber;
   (g) vane blade means fixably mounted to said vanes, said vane blade means comprised of a plurality of elastomer strips and a metal strip partially sandwiched between said elastomer strips, and said metal strips fixably mounted to the radial extremes of each of said vanes and having an axial extension equal to that of said vane, said metal strip having an elbow extension not sandwiched by said elastomer strips and is in contact with said housing walls, said elbow extension being directed away from the direction of rotation of said shaft, said vane blade means in sealing engagement with the walls of said housing chamber such that thermal expansion of said vane creates a reactive compressive load from said housing wall on said metallic member which translates said compressive load to a rotational displacement within said vane blade means while maintaining an effective sealing engagement with said wall of said housing;

(h) a plurality of shrouds fixably mounted to the opposing axial extremes of said vanes parallel to said end walls, said shrouds are also fixably mounted to said shaft to form pockets with said vanes, said shrouds being of a circular construction with a radial extension within said cylindrical chamber providing for a minimum clearance sufficient to allow for thermal change without engaging said cylindrical chamber; and (i) means for providing a seal between said end walls and said shrouds.

2. The rotatable valve apparatus of claim 1 in which the elastomer material is a silicone rubber.

* * * * *